(12) United States Patent
Malik

(10) Patent No.: US 6,618,370 B1
(45) Date of Patent: Sep. 9, 2003

(54) SYSTEM AND METHOD FOR BANDWIDTH ON DEMAND FOR INTERNET SERVICE PROVIDERS

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/440,848

(22) Filed: Nov. 16, 1999

(51) Int. Cl.[7] .......................... G06F 15/16; H04L 12/66; H04M 1/64
(52) U.S. Cl. ...................... 370/352; 379/88.17; 709/203
(58) Field of Search ................................. 370/351, 352, 370/356, 410, 389, 463; 709/203; 379/88.17

(56) References Cited

U.S. PATENT DOCUMENTS

| | | | |
|---|---|---|---|
| 5,701,301 A | | 12/1997 | Weisser, Jr. |
| 5,774,533 A | | 6/1998 | Patel |
| 6,014,379 A | * | 1/2000 | White et al. ................ 370/389 |
| 6,084,872 A | * | 7/2000 | Munson et al. ............. 370/351 |
| 6,084,892 A | * | 7/2000 | Benash et al. .............. 370/701 |
| 6,351,453 B1 | * | 2/2002 | Nolting et al. .............. 370/234 |
| 6,415,027 B1 | * | 7/2002 | Malik ...................... 379/221.01 |

OTHER PUBLICATIONS

Bellcore Technical Reference NWT–001284, Issue 1, "Advanced Intelligent Network (AIN) 0.1 Switching Systems Generic Requirements" (Aug. 1992).

* cited by examiner

*Primary Examiner*—Alpus H. Hsu
*Assistant Examiner*—Toan Nguyen
(74) *Attorney, Agent, or Firm*—Shaw Pittman LLP

(57) ABSTRACT

A telecommunications system and method for increasing communications bandwidth for an Internet Service Provider ("ISP") to accommodate temporary fluctuations in demand. The present invention utilizes an Advanced Intelligent Network ("AIN") to re-direct calls from a subscriber to an ISP from the ISP's modem pools to a shared modem pool operated by a telephone service provider ("telco") when the ISP needs additional bandwidth. The shared modem pool is controlled by an access server and a remote authentication dial-in user service server managed by the telco. The telco servers identify the identified ISP to receive the call by looking at the original number dialed by the caller. The telco servers then communicate with the proper ISP which determines whether or not the caller is a valid subscriber of the ISP.

18 Claims, 2 Drawing Sheets

SYSTEM AND METHOD FOR BANDWIDTH ON DEMAND FOR INTERNET SERVICE PROVIDERS

BACKGROUND

1. Field of the Invention

The present invention relates generally to telecommunications systems. More particularly, the present invention relates to an advanced intelligent network system for providing flexible bandwidth to an Internet Service Provider commensurate with the demands for dial-up access to the Internet Service Provider's resources.

2. Background of the Invention

Over the last ten years, use of the Internet has grown rapidly. A large segment of this growth stems from an increase in individual dial-up subscribers. These dial-up subscribers use the public switched telephone network ("PSTN") to establish connections to their Internet Service Providers ("ISPs"). FIG. 1 is a schematic diagram illustrating how these dial-up subscribers, or users, connect to their ISPs using PSTN 10. To support multiple connections, ISPs must maintain numerous telephone lines connected to modems. Rather than advertising a different telephone number for each telephone line, ISPs generally advertise a limited number of telephone access numbers. Each telephone access number corresponds to one or more telephone lines. These telephone lines may be made up of, e.g., individual POTS lines, one or more T1 lines, or Primary Rate Integrated Services Digital Network ("PRI") lines. For simplicity, the figures and discussion herein show the connections to be made up of PRI lines.

As shown in FIG. 1, ISP 20 may provide multiple telephone access numbers, each corresponding to PRI lines connected to multi-line hunt groups ("MLHGs"). MLHGs are modem pools allowing multiple simultaneous connections to the ISP via a single telephone access number. A multi-line hunt group takes incoming subscriber calls and routes them to the first open modem in the modem pool. FIG. 1 shows four sets of PRI lines 26–29 connected to four MLHGs 22a–22d, respectively. The MLHGs are controlled by access server 23. When caller 30 dials one of ISP 20's telephone access numbers (using computer 31, modem 32 and subscriber line 33), PSTN 10 processes the call like any other call. That is, the call is routed between caller 30 and the called party (in this case, ISP 20) through one or more service switching points ("SSPs" or "switches"). If the lines corresponding to the dialed telephone access number are all busy, or "off-hook", i.e., there are no voice communications paths available, the caller gets a busy signal, which is provided by PSTN 10.

If lines are available, the ISP's switch, SSP 12 in FIG. 1, terminates the call. Access server 23 answers the call and determines whether or not the caller is a valid ISP subscriber. If the caller is valid, then access server 23 must determine which services the caller should have access to. Access server 23 queries caller 30 for information such as a username and password for use in validating caller 30 and determining caller 30's authorized services. The dialog between caller 30 and access server 23 is usually performed automatically between access server 23 and communications software operating on computer 31.

Generally, ISPs use centralized servers to store and manage their subscriber databases. Remote Authentication Dial-In User Service ("RADIUS") server 24, having database 24a, is functionally connected to access server 23 and provides this centralized management. Thus, access server 23 collects username and password information from caller 30 and passes it on to RADIUS server 24. After RADIUS server 24 verifies caller 30's username and password, it provides access server 23 with configuration information specific to caller 30. Access server 23 uses the configuration information to provide the authorized services to caller 30. Access servers and RADIUS servers are described in more detail in commonly assigned U.S. patent application, Ser. No. 09/133,299, which is incorporated herein by reference in its entirety. Additional information on access servers and RADIUS servers may be found in Rigney et al., *Remote Authentication Dial-In User Service (RADIUS)*, Network Working Group, January, 1997, or in Rigney et al., *RADIUS Accounting*, Network Working Group, April, 1997.

An ISP incurs great costs for purchasing and maintaining the telecommunications infrastructure needed to operate its business. The ISP must pay its local telephone service provider ("telco") for each telephone line maintained. Additionally, the ISP must purchase and maintain MLHGs and the associated modems for the groups. Finally, the ISP must manage and balance the load on each of its MLHGs in order to provide efficient connections for its subscribers. Due to the high cost of purchasing and maintaining the infrastructure, it is desirable for an ISP to provide only as many lines and modems as are required to accommodate its subscribers' demand.

It is well known in the art that not all subscribers connect to their ISPs at the same time. Additionally, not all subscribers connect every day, nor do they connect for the same length of time each session. For this reason, it is not cost-effective for ISPs to provide a 1:1 ratio of lines to subscribers. Instead, ISPs have developed formulas to determine the appropriate number of telephone lines required. In general, a telephone line to user ratio of at least 1:10 provides an acceptable level of service. However, as Internet usage continues to grow, it is becoming more difficult to predict the requirements for telephone lines into an ISP. Thus, a need exists for a system and method to balance the competing interests of reducing ISP costs and providing acceptable levels of service for ISP subscribers. A further need exists for a system and method providing ISPs with flexible access to increased telephone lines and modems, i.e., increased bandwidth, as the need arises to support the ISPs' customers. A system and method is needed to provide such flexible bandwidth on demand for ISP's without significantly increasing the complexity or costs for ISP operations.

SUMMARY OF THE INVENTION

The present invention provides a system and method allowing ISPs to dynamically expand the number of telephone lines and modems available to ISP subscribers dialing into ISP systems. The present invention utilizes an Advanced Intelligent Network ("AIN") to provide an automated system and method for providing this flexible bandwidth to ISPs. AIN systems are described in U.S. Pat. No. 5,701,301, U.S. Pat. No. 5,774,533 and Bellcore Specification TR-NWT-001284, Switching Systems Generic Requirements for AIN 0.1, which are incorporated herein by reference in their entirety. FIG. 2 shows the important components of the AIN used in the present invention. The steps described herein can be performed by computer-readable program code operating on the various AIN components and other computer systems, as described below.

In a preferred embodiment of the present invention, an AIN automatic flexible route ("AFR") trigger is provisioned on the trunk group in SSP 212 providing PRI lines 226 into ISP 220. The PRI lines are connected to MLHG 222 at the ISP, which is reached by dialing the corresponding telephone access number. The trigger is activated when a subscriber dials the telephone access number and there are no open lines available. In response to the trigger, a database query goes from SSP 212 to service control point ("SCP") 215 via ss7 network 213. SCP 215 writes the contents of the called party number ("CdPN") field, i.e., the dialed ISP telephone access number, into the calling party number ("CgPN") field and specifies a new location to forward the call with instructions to monitor the call for termination status. The call is thus forwarded to the telco's shared modem pool, MLHG 219, without losing the ISP telephone access number dialed by the subscriber. In this manner, the telco's proxy RADIUS server 217 can determine which ISP the call will be directed to.

Acting on the instructions from SCP 215, SSP 212 forwards the call setup message to SSP 214 since that SSP serves the telco's shared modem pool, MLHG 219. SSP 214 terminates the call to MLHG 219, provided a line is available. If the call is terminated, SSP 212 informs the SCP as requested by the termination notification message. Upon receipt of the informational message, the SCP updates a database used to track the number of users from the ISP using the telco's shared modem pool.

Access server 218 records the CgPN and answers the call. Proxy RADIUS server 217 looks up the ISP domain based on the CgPN and routes the information to the ISP's RADIUS server 224. RADIUS server 224 then initiates the point-to-point protocol session with the subscriber to validate the username and password.

When the caller'session ends, i.e., when the call is disconnected, SSP 212 sends the SCP an informational message in response to the previous termination notification request. Again, the SCP uses the information to update its database to track the number of callers from each ISP using the telco's shared modem pool. This information provides the telco with any data necessary to manage the service. For example, the telco may charge ISPs for each session connected through the shared modem pool. In another example, the ISP may "subscribe" to a service allowing a pre-defined number of overflow customers. Once the slots for that ISP are in use, subsequent callers will receive a busy signal. The telco can create reports for analyzing usage trends for each ISP. For example, if one ISP is historically using a large portion of the shared modem pool, the telco may use the information in a marketing strategy to sell increased permanent bandwidth to the ISP.

It is an object of the present invention to provide an automated system for increasing an ISP's capacity for dial-up subscribers.

It is another object of the present invention to provide ISPs increased bandwidth on demand according to the ISPs' requirements.

It is another object of the present invention to use an Advanced Intelligent Network to provide efficient allocation of telecommunications resources among multiple ISPs.

It is another object of the present invention to provide a system to increase Internet subscribers' chances of obtaining a connection to their ISPs.

It is another object of the present invention to provide increased bandwidth to an ISP in a manner transparent to the ISP's subscribers.

These and other objects of the present invention are described in greater detail in the detailed description of the invention, the appended drawings and the attached claims.

DETAILED DESCRIPTION OF THE INVENTION

Figure 1:
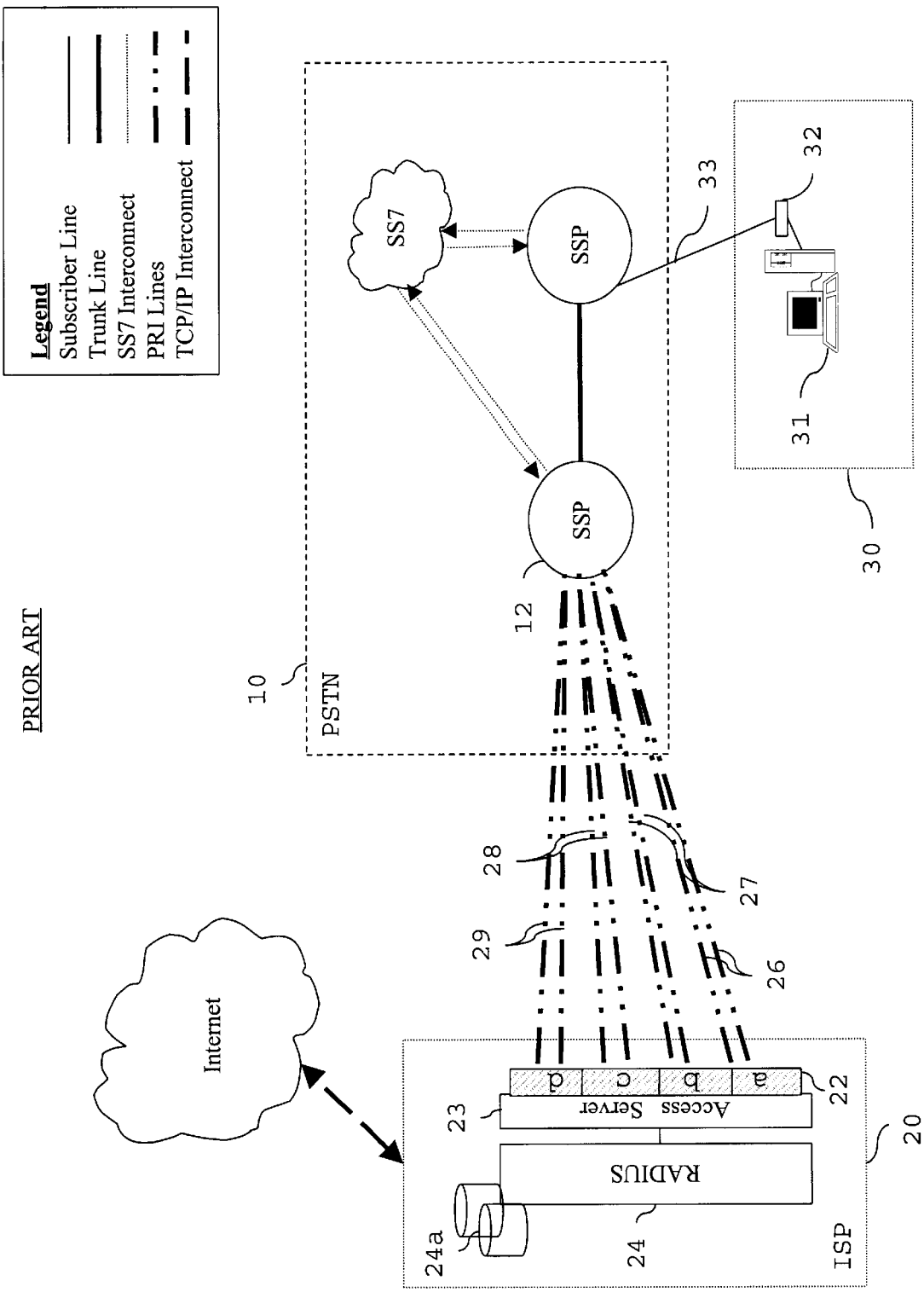
FIG. 1 is a schematic diagram illustrating the systems and methods used to accommodate dial-up subscribers in the prior art.
Figure 2:
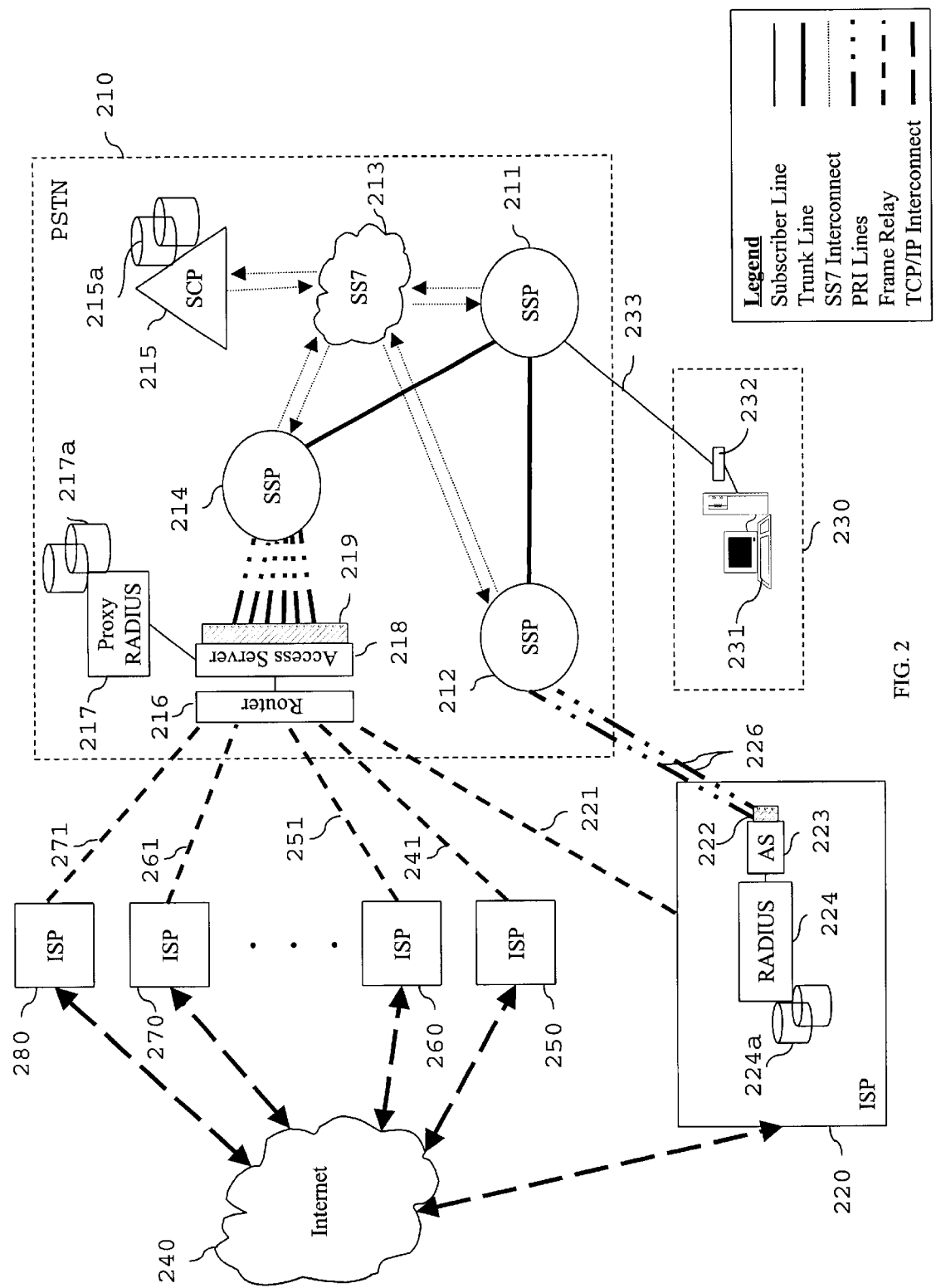
FIG. 2 is a schematic diagram showing the main components of an AIN used in an embodiment of the present invention.

FIG. 2 shows the key components of the AIN used in the present invention. Such AIN components include one or more switches, SSP 211, 212 and 214, SCP 215, and Common Channel Signaling System 7 ("SS7") network 213. SSP 211 serves caller 230 who is connected via subscriber line 233. Caller 230 uses computer 231 and modem 232 to dial into ISP 220 for connection to Internet 240. ISP 220 has MLHG 222, connected to SSP 212 via PRI lines 226. MLHG 222 is controlled by access server 223, which uses RADIUS server 224 for central management of ISP 220's subscriber accounts. RADIUS server 224 has database 224a as shown in FIG. 2.

In a preferred embodiment of the present invention, an Automatic Flexible Route ("AFR") trigger is provisioned on SSP 212 for the trunk group supporting PRI lines 226. As noted above, when caller 230 dials the telephone access number for ISP 220, the AFR trigger will be activated only if all lines in the trunk group are busy. If a line is available, SSP 212 terminates the call to MLHG 222, and ISP 220 processes the call directly. However, if all of the lines in the trunk group are busy, the AFR trigger prompts SSP 212 to issue a database query to SCP 215. The database query is a standard AIN query and contains information such as a CgPN field and a CdPN field.

SCP 215 responds to the query by checking database 215a for routing directions and updates a counter tracking the number of calls that have been rerouted for 220. If the counter indicates that ISP 220 has no more slots reserved in shared modem pool 219, SCP 215 instructs SSP 212 to issue a busy signal. In a preferred embodiment, SCP 215 updates another counter tracking the number of rejected callers and sends periodic reports to ISP 220's RADIUS server 224 via a gateway server (not shown in FIG. 2). ISP 220 can use the information to determine if more hardware is necessary either within its own network, or if more slots should be purchased from the telco. Additionally, in a preferred embodiment, RADIUS server 224 can dynamically increase or decrease the number of reserved slots by sending authorization to SCP 215 via the gateway server.

After determining that ISP 220 has an available slot, SCP 215 continues processing its response to SSP 212's database query by replacing the CgPN with the CdPN and replacing the CdPN with a telephone access number for the telco's shared modem pool. For example, if the ISP's telephone access number is "222-222-1000," the telco's shared modem pool, MLHG 219, has telephone access number "222-333-1000," and caller 230's telephone directory number is "222-444-1000." The database query from SSP 212 would contain the following information:

CgPN="2224441000" and CdPN="2222221000." In contrast, the response from SCP 215 would contain the following information: CgPN="2222221000" and CdPN="2223331000."

SCP 215 completes its response to SSP 212 by instructing SSP 212 to forward the call to the new CdPN and to monitor the call status. In a preferred embodiment, SCP 215 sends a Forward_Call instruction and a Send_Notification instruction. In response to the Forward_Call instruction and the new CdPN, SSP 212 forwards the call setup message to SSP 214 for processing. In response to the Send_Notification, SSP212 will inform SCP 215 of when the call is terminated, (dropped for an reason). This information is used by SCP 215 to update the counters discussed above.

Once the call is connected to MLHG 219, the telco's shared resources, i.e., MLHG 219, access server 218 and proxy RADIUS server 217 process the call in lieu of processing by ISP 220. Access server 218 answers the call and informs Proxy RADIUS server 217 of the CgPN and the port on which the call was connected. Proxy RADIUS server 217 looks up the CgPN in database 217a to determine which ISP the call should be routed to. Based on the CgPN, SCP 215 determines that the call is for ISP 220 so a message is sent to RADIUS server 224. The message informs RADIUS server 224 of the subscriber's port and instructs RADIUS server 224 to initiate the point-to-point protocol session with the subscriber to validate the username and password.

RADIUS server 224 communicates with access server 218 via router 216. Access server 218 prompts caller 230 for the usual information, such as username and password. Access server 218 thus operates in place of access server 223. Caller 230 is unaware of the changed routing for the call and is unaware that the access server processing the call is not one managed by the ISP. Access server 218 sends the username, password and CgPN to RADIUS server 224 for authentication.

As shown in FIG. 2, router 216 functionally separates the various network connections to multiple ISPs. FIG. 2 shows ISPs 220, 250, 260, 270 and 280 connected to router 216 via interconnects 221, 241, 251, 261, 271 and 281, respectively. In a preferred embodiment, these interconnects comprise frame relay circuits forming "private" high-speed connections between the ISPs and the telco. Because proxy RADIUS server 217 supports multiple ISPs, each call coming into MLHG 219 must identify the caller's ISP. Proxy RADIUS server 217 has a database (not shown) listing the telephone access numbers for each ISP it serves. Using this database and the CgPN received from access server 218, proxy RADIUS server 217 is able to identify the proper ISP.

Proxy RADIUS server 217 forwards the username and password information on to the ISP's RADIUS server for verification. For example, since the CgPN is "2222221000," proxy RADIUS server 217 looks in the database and determines that caller 230 is trying to access ISP 220. Thus, proxy RADIUS server 217 sends caller 230's username and password on to RADIUS server 224. RADIUS server 224 verifies the information and informs proxy RADIUS server 217 of the result. If the username and password are valid, proxy RADIUS server 217 instructs access server 218 to grant access to the caller,. using configuration information provided by RADIUS server 224. If the username and password are invalid, proxy RADIUS server 217 instructs access server 218 to deny access to the caller.

As noted above, SCP 215 keeps track of the number of subscribers from each ISP using the telco's shared resources for access. This information may be used in a variety of ways. For example, the telco may generate bills to the ISPs for "renting" the telco's resources. Such bills could be generated to charge the ISP according the minutes used by its subscribers during the billing period. Alternatively, the bills could be generated based on the number times the shared modem pool was accessed by an ISP subscriber. The telco may also use the information in sales and marketing strategies in dealing with its ISP customers. The data may help ISPs identify usage trends and could be used to project future requirements for subscriber support.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A system for providing increased bandwidth for dial-up connections into an internet service provider on a temporary basis in response to customer demand comprising:

(a) a first switch in communication with a service control point, a second switch and a shared modem pool, said first switch having a first telephone access number and said second switch having a second telephone access number provisioned with a trigger; and (b) a first remote authentication dial-in user service server in communication with an access server and a second remote authentication dial-in user service server, said access server in communication with the shared modem pool, wherein when a call is received at the second switch having the second telephone access number in a called party field, if the call cannot be terminated, the second switch sends a query message to the service control point, wherein the service control point sends a response to the second switch comprising the second telephone access number in a calling party number field, and the first telephone access number in the called party field, wherein when the first switch terminates the call to the first telephone access number, the access server retrieves the second telephone access number from the calling party number field, the access server answers the call on the shared modem pool, the access server receives a plurality of data, the access server transmits the plurality of data and the second telephone access number to the first remote authentication dial-in user service server, wherein the first remote authentication dial-in user service server identifies the second remote authentication dial-in user service server according to the second telephone access number and transmits the plurality of data to the second remote authentication dial-in user service server, wherein the second remote authentication dial-in user service server verifies the plurality of data and provides a connection instruction to the first remote authentication dial-in user service server, wherein the first remote authentication dial-in user service server transmits the connection instruction to the access server, and wherein the access server sets up a dial-up connection according to the connection instruction.

2. The system of claim 1, wherein the connection instruction comprises a notice of a valid user.

3. The system of claim 2, wherein the dial-up connection comprises a point-to-point protocol connection.

4. The system of claim 1, wherein the connection instruction comprises a notice of an invalid user.

5. The system of claim 4, wherein the dial-up connection comprises the notice of an invalid user and a disconnection from the shared modem pool.

6. The system of claim 1, wherein the response from the service control point to the switch further comprises a continue message and a termination notification request message.

7. The system of claim 1, wherein the trigger is an automatic flexible route trigger.

8. The system of claim 1, wherein the service control point further comprises a database for logging each call connected to the shared modem pool.

9. The system of claim 1, further comprising a means for generating a bill for using the shared modem pool.

10. The system of claim 1, further comprising means for generating a plurality of reports.

11. The system of claim 1, further comprising a frame relay circuit for communications between the first and second remote authentication dial-in user service servers.

12. The system of claim 1, wherein the service control point communicates with the switch via a Common Channel Signaling System 7 network.

13. A method for providing increased bandwidth for dial-up connections into an internet service provider on a temporary basis, in response to customer demand comprising the steps of:

(a) provisioning a trigger on a first telephone access number on a switch;

(b) when a call is received at the switch having the first telephone access number in a called party field, if the call cannot be terminated, sending a query message from the switch to a service control point in response to the trigger;

(c) sending a response from the service control point to the switch, said response comprising the first telephone access number in a calling party number field, and a second telephone access number in the called party field;

(d) terminating the call to the second telephone access number according to the response thereby connecting the call to a shared modem pool in communication with an access server;

(e) retrieving the first telephone access number from the calling party number field at the access server, answering the call, and receiving a plurality of data;

(f) transmitting the plurality of data and the first telephone access number from the access server to a first remote authentication dial-in user service server;

(g) identifying a second remote authentication dial-in user service server according to the first telephone access number;

(h) transmitting the plurality of data to the second remote authentication dial-in user service server;

(i) verifying the plurality of data at the second remote authentication dial-in user service server, and sending a connection instruction to the first remote authentication dial-in user service server;

(j) transmitting the connection instruction from the first remote authentication dial-in user service server to the access server; and (k) setting up a dial-up connection on the access server according to the connection instruction.

14. The method of claim 13, wherein the response from the service control point to the switch further comprises a continue message and a termination notification request message.

15. The method of claim 13, wherein the trigger is an automatic flexible route trigger.

16. The method of claim 13, further comprising the step of logging each call connected to the shared modem pool in a database on the service control point.

17. The method of claim 13, further comprising the step of generating a bill for using the shared modem pool.

18. The method of claim 13, further comprising the step of generating a plurality of reports.

* * * * *